(12) United States Patent
Shih et al.

(10) Patent No.: US 11,347,363 B2
(45) Date of Patent: May 31, 2022

(54) TOUCH ELECTRODE STRUCTURE AND CAPACITIVE TOUCH SYSTEM

(71) Applicant: SILICON INTEGRATED SYSTEMS CORP., Hsinchu (TW)

(72) Inventors: Wei-En Shih, Hsinchu (TW); Ying-Jyh Yeh, Hsinchu (TW); Yi-Chun Chen, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 0 days.

(21) Appl. No.: 17/107,291

(22) Filed: Nov. 30, 2020

(65) Prior Publication Data
US 2021/0173526 A1    Jun. 10, 2021

(30) Foreign Application Priority Data
Dec. 6, 2019   (TW) .................................. 108144768

(51) Int. Cl.
*G06F 3/044* (2006.01)

(52) U.S. Cl.
CPC .......... *G06F 3/0446* (2019.05); *G06F 3/0448* (2019.05); *G06F 2203/04108* (2013.01)

(58) Field of Classification Search
CPC ................. G06F 3/0446; G06F 3/0448; G06F 2203/04108
See application file for complete search history.

(56) References Cited

U.S. PATENT DOCUMENTS

| | | | |
|---|---|---|---|
| 2014/0168536 A1* | 6/2014 | Guo ...................... | G06F 3/0443 349/12 |
| 2015/0317009 A1* | 11/2015 | Hara ..................... | G06F 3/0442 345/173 |
| 2017/0090625 A1* | 3/2017 | Makino ................. | G06F 3/0443 |
| 2019/0107905 A1* | 4/2019 | Maruyama ............ | G06F 3/0446 |

* cited by examiner

*Primary Examiner* — Amit Chatly

(57) ABSTRACT

A touch electrode structure and a capacitive touch system are provided. The touch electrode structure includes: a substrate; a plurality of first electrode series each including a plurality of first electrodes; a plurality of second electrode series each including a plurality of second electrodes; and at least one connecting wire. Each of the second electrode series includes at least one electrode group, and the at least one electrode group includes two of the second electrodes. The two of the second electrodes are electrically connected to each other on a first surface of the substrate, and at least one of the two of the second electrodes is electrically connected to one of the second electrodes adjacent to the at least one of the two of the second electrodes.

2 Claims, 4 Drawing Sheets

TOUCH ELECTRODE STRUCTURE AND CAPACITIVE TOUCH SYSTEM

TECHNICAL FIELD OF DISCLOSURE

The present disclosure relates to the field of touch technologies, and more particularly to a touch electrode structure and a capacitive touch system.

BACKGROUND OF DISCLOSURE

In a capacitive touch system, a touch signal or a hover signal on a touch panel is sensed by a plurality of touch electrodes. The touch electrodes include a plurality of driving electrodes and a plurality of sensing electrodes. The driving electrodes and the sensing electrodes are formed on a substrate. When the substrate includes four layers of wires, the substrate is a four-layer board. When the substrate includes two layers of wires, the substrate is a two-layer board.

Since the number of the touch electrodes is large, vias and connecting wires are required to connect two adjacent ones of the touch electrodes together. When the substrate is a two-layer board, the vias and the connecting wires can only be formed on one surface of the substrate. Occupied space on the substrate is large, and thus space which can be used is decreased.

Therefore, there is a need to solve the above-mentioned problem in the prior art.

SUMMARY OF DISCLOSURE

An objective of the present disclosure is to provide a touch electrode structure and a capacitive touch system capable of solving the problem in the prior art.

The touch electrode structure of the present disclosure includes: a substrate; a plurality of first electrode series formed on a first surface of the substrate in a first direction, wherein each of the first electrode series includes a plurality of first electrodes; a plurality of second electrode series formed on the first surface of the substrate in a second first direction, wherein each of the second electrode series includes a plurality of second electrodes; and at least one connecting wire formed on a second surface of the substrate, wherein each of the second electrode series includes at least one electrode group, the at least one electrode group includes two of the second electrodes, the two of the second electrodes are electrically connected to each other on the first surface of the substrate, and at least one of the two of the second electrodes is electrically connected to, through the at least one connecting wire, one of the second electrodes adjacent to the at least one of the two of the second electrodes.

The capacitive touch system of the present disclosure includes a touch panel including a touch electrode structure. The touch electrode structure includes: a substrate; a plurality of first electrode series formed on a first surface of the substrate in a first direction, wherein each of the first electrode series includes a plurality of first electrodes; a plurality of second electrode series formed on the first surface of the substrate in a second first direction, wherein each of the second electrode series includes a plurality of second electrodes; and at least one connecting wire formed on a second surface of the substrate, wherein each of the second electrode series includes at least one electrode group, the at least one electrode group includes two of the second electrodes, the two of the second electrodes are electrically connected to each other on the first surface of the substrate, and at least one of the two of the second electrodes is electrically connected to, through the at least one connecting wire, one of the second electrodes adjacent to the at least one of the two of the second electrodes; and a touch detection unit electrically connected to the touch electrode structure and configured to detect a touch signal or a hover signal on the touch electrode structure.

In the touch electrode structure and the capacitive touch system of the present disclosure, since at least one electrode group of each second electrode series includes two second electrodes which are electrically connected to each other, a connecting wire is not required between the two second electrodes of the at least one electrode group. The number of the connecting wires and the number of the vias can be saved. Furthermore, the present disclosure provides several types of patterns of the second electrodes, an advantage that a wiring layout is simple or that touch accuracy and linearity can be increased can be reached.

DETAILED DESCRIPTION OF DISCLOSURE

To make the objectives, technical schemes, and technical effects of the present disclosure more clearly and definitely, the present disclosure will be described in detail below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

Figure 1:
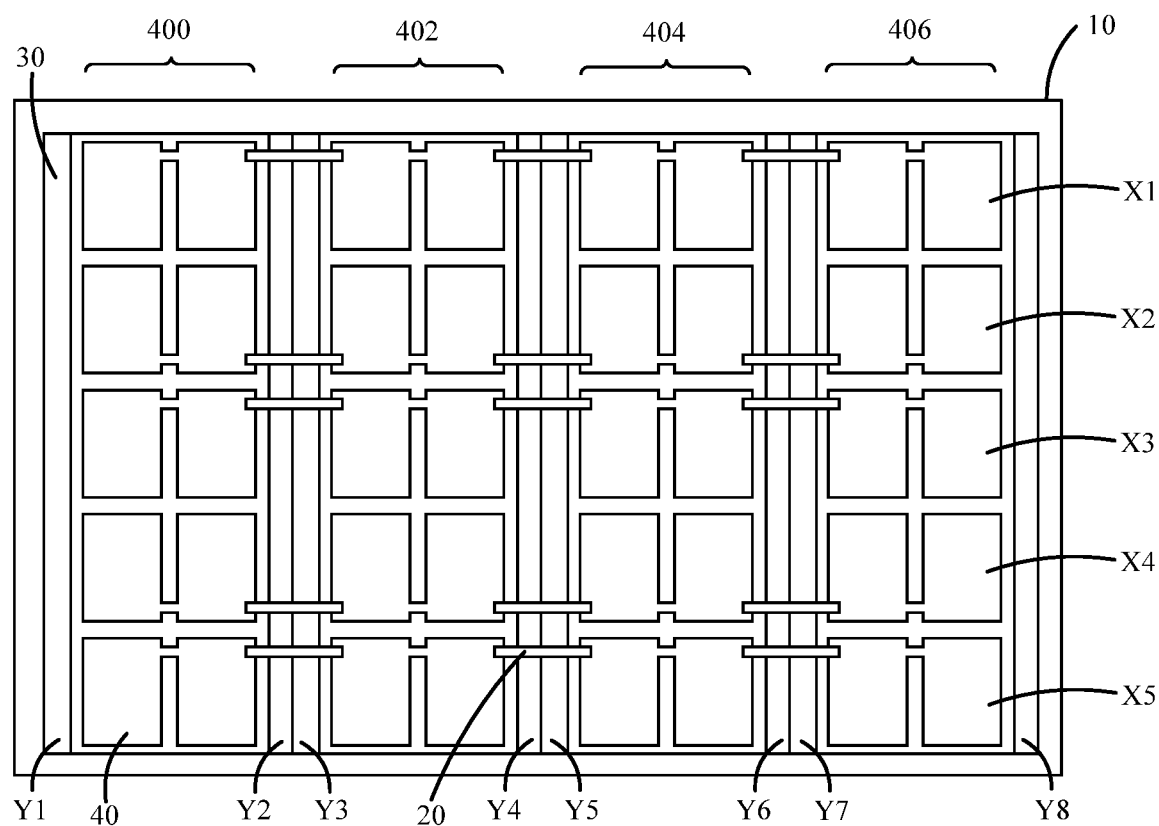
FIG. 1 illustrates a touch electrode structure in accordance with an embodiment of the present disclosure.

Please refer to FIG. 1. FIG. 1 illustrates a touch electrode structure in accordance with an embodiment of the present disclosure.

The touch electrode structure includes a substrate 10, a plurality of first electrode series Y1-Y8, a plurality of second electrode series X1-X5, and at least one connecting wire 20 (plural connecting wires 20 are shown in FIG. 1).

The substrate 10 is a two-layer board. In detail, wires and related elements are only formed on two surfaces of the substrate 10. The first electrode series Y1-Y8 are formed on a first surface (e.g., a bottom surface) of the substrate 10 in a first direction. Each of the first electrode series Y1-Y8 includes a plurality of first electrodes 30. It is noted that since all of the first electrodes 30 have the same shape and an insulating material is not formed between two adjacent ones of the first electrodes 30, each of the first electrode series Y1-Y8 in FIG. 1 is a long strip.

The second electrode series X1-X5 are formed on the first surface of the substrate 10 in a second direction. Each of the second electrode series X1-X5 includes a plurality of second electrodes 40. The first direction is different from the second direction. In the present embodiment, the first direction is perpendicular to the second direction. The connecting wires 20 are formed on a second surface (e.g., a top surface) of the substrate 10.

The first electrode series Y1-Y8 are electrically insulated from the second electrode series X1-X5. Two adjacent ones of the first electrode series Y1-Y8 are electrically insulated from each other. All of the first electrodes 30 in the same first electrode series are electrically connected together on the first surface of the substrate 10. That is, all of the first electrodes 30 in the first electrode series Y1 are electrically connected together on the first surface of the substrate 10. All of the first electrodes 30 in the first electrode series Y2 are electrically connected together on the first surface of the substrate 10. All of the first electrodes 30 in each of the first electrode series Y3-Y8 are electrically connected together on the first surface of the substrate 10.

Two adjacent ones of the second electrode series X1-X5 are electrically insulated from each other. Each of the second electrode series X1-X5 includes at least one electrode group. The at least one electrode group includes two adjacent (continuous) ones of the second electrodes 40. The two of the second electrodes 40 are electrically connected to each other on the first surface of the substrate 10. At least one of the two of the second electrodes 40 is electrically connected to, through the connecting wire 20, one of the second electrodes 40 adjacent to the at least one of the two of the second electrodes 40.

For example, the second electrode series X1 includes eight second electrodes 40 and includes four electrode groups 400-406. The electrode group 400 includes two adjacent (continuous) second electrodes 40. The two second electrodes 40 are electrically connected to each other on the first surface of the substrate 10. The second electrode 40 at the right side is electrically connected to, through the connecting wire 20, one second electrode 40 adjacent to the second electrode 40 at the right side.

The electrode group 402 includes two adjacent (continuous) second electrodes 40. The two second electrodes 40 are electrically connected to each other on the first surface of the substrate 10. The two second electrodes 40 are electrically connected to, through the connecting wires 20, two second electrodes 40 adjacent to the two second electrodes 40.

The electrode group 404 includes two adjacent (continuous) second electrodes 40. The two second electrodes 40 are electrically connected to each other on the first surface of the substrate 10. The two second electrodes 40 are electrically connected to, through the connecting wires 20, two second electrodes 40 adjacent to the two second electrodes 40.

The electrode group 406 includes two adjacent (continuous) second electrodes 40. The two second electrodes 40 are electrically connected to each other on the first surface of the substrate 10. The second electrode 40 at the left side is electrically connected to, through the connecting wire 20, one second electrode 40 adjacent to the second electrode 40 at the left side.

In summary, the electrode group 400 (formed on the first surface of the substrate 10) is electrically disconnected from the electrode group 402 (formed on the first surface of the substrate 10). Accordingly, it is necessary to use the connecting wire 20 (formed on the second surface of the substrate 10) to electrically connect the electrode group 400 (formed on the first surface of the substrate 10) to the electrode group 402 (formed on the first surface of the substrate 10). The electrode group 402 (formed on the first surface of the substrate 10) is electrically disconnected from the electrode group 404 (formed on the first surface of the substrate 10). Accordingly, it is necessary to use the connecting wire 20 (formed on the second surface of the substrate 10) to electrically connect the electrode group 402 (formed on the first surface of the substrate 10) to the electrode group 404 (formed on the first surface of the substrate 10). The electrode group 404 (formed on the first surface of the substrate 10) is electrically disconnected from the electrode group 406 (formed on the first surface of the substrate 10). Accordingly, it is necessary to use the connecting wire 20 (formed on the second surface of the substrate 10) to electrically connect the electrode group 404 (formed on the first surface of the substrate 10) to the electrode group 406 (formed on the first surface of the substrate 10).

In the prior art, two adjacent second electrodes in the same second electrode series are electrically disconnected from each other. Accordingly, it is necessary to use a connecting wire to electrically connect the two adjacent second electrodes together. In the touch electrode structure of the present disclosure, each of the second electrode series X1-X5 includes at least one electrode group. The at least one electrode group includes two second electrodes 40 which are electrically connected to each other. Accordingly, the connecting wire 20 is not required between the two second electrodes 40 of the at least one electrode group. The number of the connecting wires 20 can be saved.

In the present embodiment, each of the second electrode series X1-X5 includes the four electrode groups 400-406. Accordingly, four connecting wires 20 can be saved for each of the second electrode series X1-X5, thereby decreasing space on the second surface of the substrate 10 occupied by the connecting wires 20. Furthermore, the number of the electrode groups included in each of the second electrode series X1-X5 is not limited. As long as the number of the electrode groups is at least one, the objective of decreasing the number of the connecting wires 20 can be achieved.

Each of the connecting wires 20 electrically connects the two adjacent second electrodes 40 together through vias (not shown). The vias penetrate the first surface and the second surface of the substrate 10. Since the number of the connecting wires 20 is decreased, the number of the vias can be decreased and space on the second surface of the substrate 10 occupied by the vias can be decreased.

Figure 2:
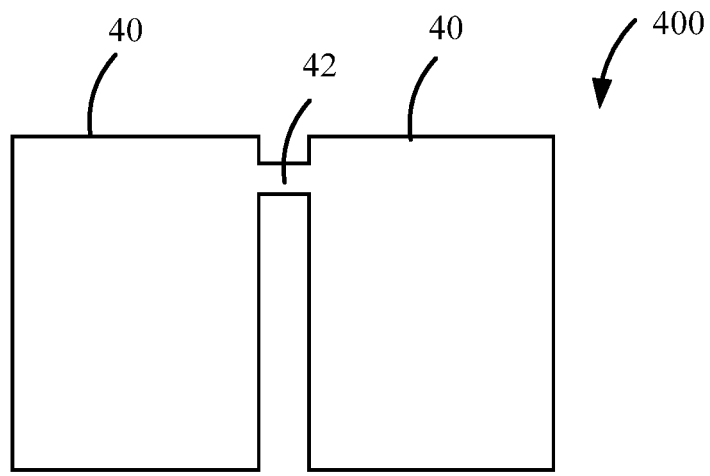
FIG. 2 illustrates an enlarged diagram of an electrode group in FIG. 1.

Please refer to FIG. 2. FIG. 2 illustrates an enlarged diagram of the electrode group 400 in FIG. 1.

The electrode group 400 includes two second electrodes 40. A shape of each of the two second electrodes 40 is rectangular, and the two second electrodes 40 are electrically connected to each other through a connecting part 42 between the two second electrodes 40. Since the two second electrodes 40 are rectangular, an advantage of the touch electrode structure in FIG. 1 is that a wiring layout is simple.

In the present embodiment, the first electrodes 30 are driving electrodes, and the second electrodes are sensing electrodes. In another embodiment, the first electrodes 30 are sensing electrodes, and the second electrodes are driving electrodes. A method of sensing a touch by the driving electrodes and the sensing electrodes is familiar by persons skilled in this art and not repeated herein.

Figure 3:
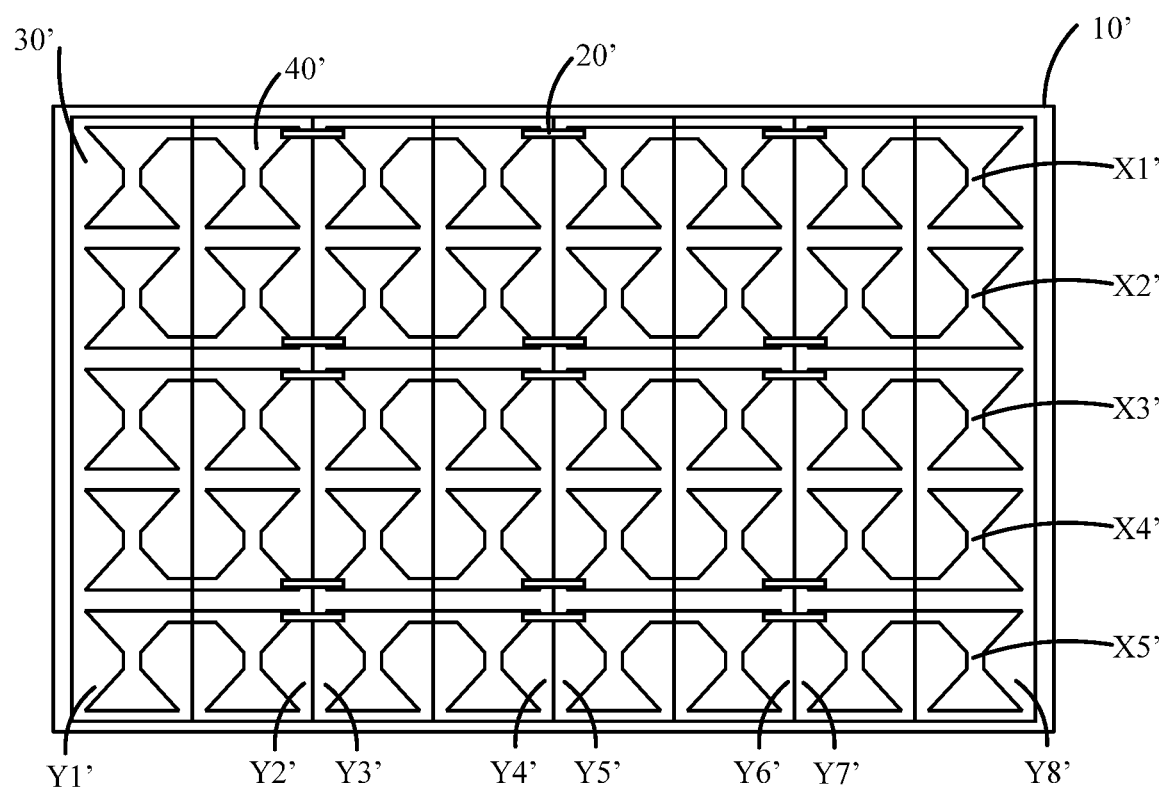
FIG. 3 illustrates a touch electrode structure in accordance with another embodiment of the present disclosure.

Please refer to FIG. 3. FIG. 3 illustrates a touch electrode structure in accordance with another embodiment of the present disclosure.

The touch electrode structure includes a substrate 10', a plurality of first electrode series Y1'-Y8', a plurality of second electrode series X1'-X5', and at least one connecting wire 20' (plural connecting wires 20' are shown in FIG. 3).

The substrate 10' is a two-layer board. In detail, wires and related elements are only formed on two surfaces of the substrate 10'. Each of the first electrode series Y1'-Y8' includes a plurality of first electrodes 30'.

Each of the second electrode series X1'-X5' includes a plurality of second electrodes 40'. The connecting wires 20' are formed on a second surface of the substrate 10'.

The rest can be referred to the related description of FIG. 1 and is not repeated herein.

A difference between the present embodiment and the embodiment of FIG. 1 is that the second electrodes 40' of the present embodiment and the second electrode 40 of the embodiment of FIG. 1 have different shapes.

Figure 4:
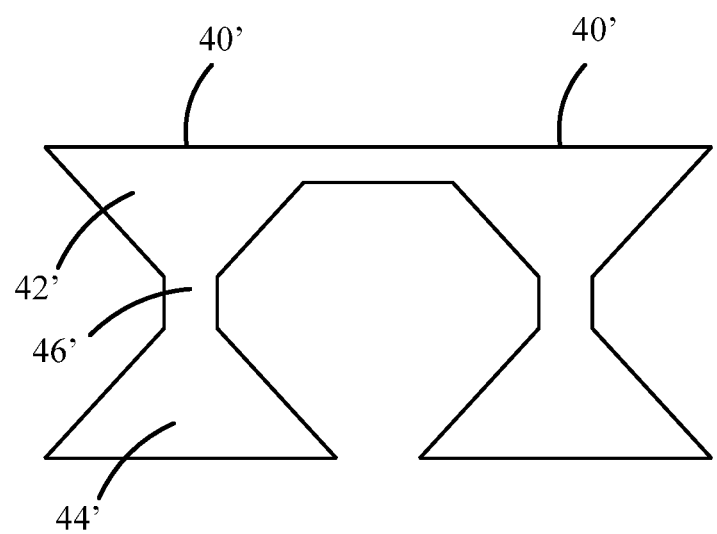
FIG. 4 illustrates an enlarged diagram of an electrode group in FIG. 3.

Please refer to FIG. 4. FIG. 4 illustrates an enlarged diagram of an electrode group in FIG. 3.

The electrode group includes two second electrodes 40'. Each of the two second electrodes 40' includes a first triangular part 42', a second triangular part 44', and a connecting part 46'. A shape of the first triangular part 42' and a shape of the second triangular part 44' are opposite to each other. The connecting part 46' is a straight line. The first triangular part 42' and the second triangular part 44' are electrically connected to each other through the connecting part 46'. An advantage of the touch electrode structure in FIG. 4 is that touch accuracy and linearity can be increased.

Figure 5:
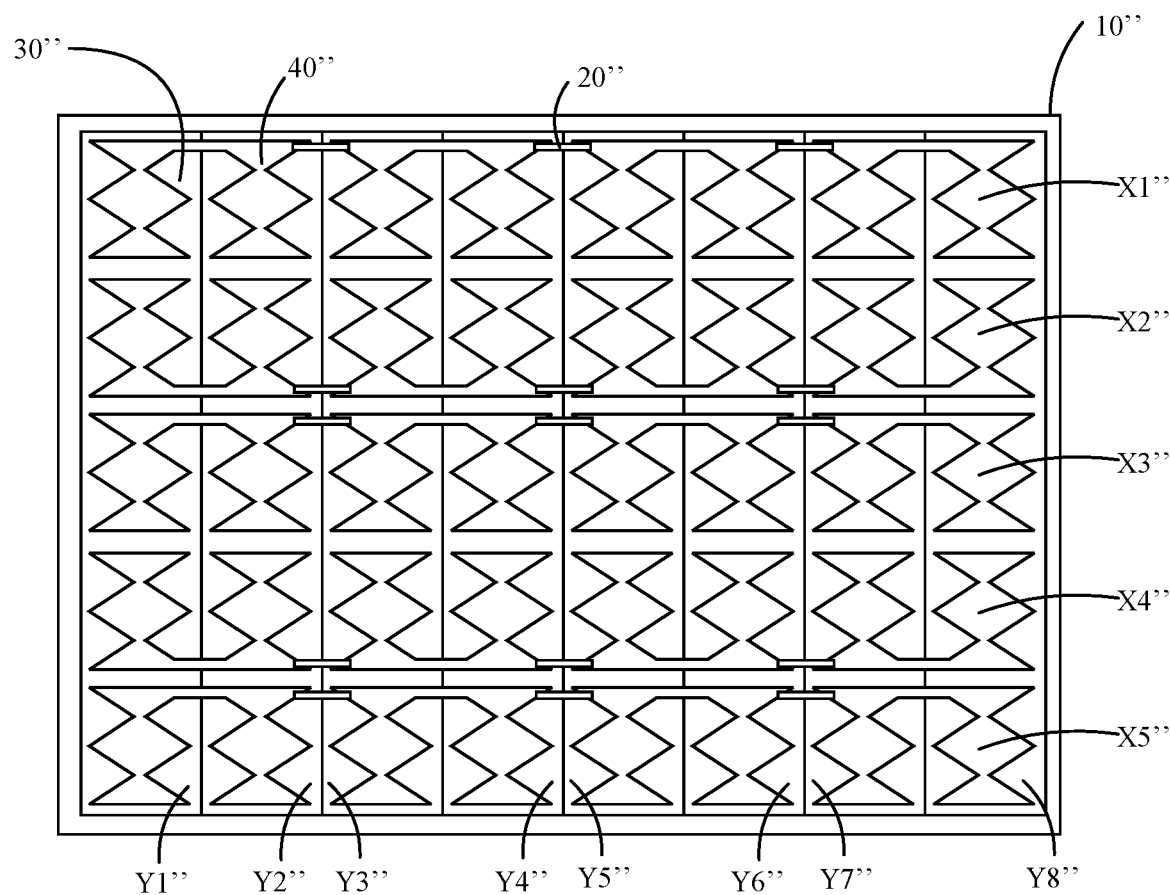
FIG. 5 illustrates a touch electrode structure in accordance with yet another embodiment of the present disclosure.

Please refer to FIG. 5. FIG. 5 illustrates a touch electrode structure in accordance with yet another embodiment of the present disclosure.

The touch electrode structure includes a substrate 10", a plurality of first electrode series Y1"-Y8", a plurality of second electrode series X1"-X5", and at least one connecting wire 20" (plural connecting wires 20" are shown in FIG. 5).

The substrate 10" is a two-layer board. In detail, wires and related elements are only formed on two surfaces of the substrate 10". Each of the first electrode series Y1"-Y8" includes a plurality of first electrodes 30".

Each of the second electrode series X1"-X5" includes a plurality of second electrodes 40". The connecting wires 20" are formed on a second surface of the substrate 10".

The rest can be referred to the related description of FIG. 1 and is not repeated herein.

A difference between the present embodiment and the embodiment of FIG. 1 is that the second electrodes 40" of the present embodiment and the second electrode 40 of the embodiment of FIG. 1 have different shapes.

Figure 6:
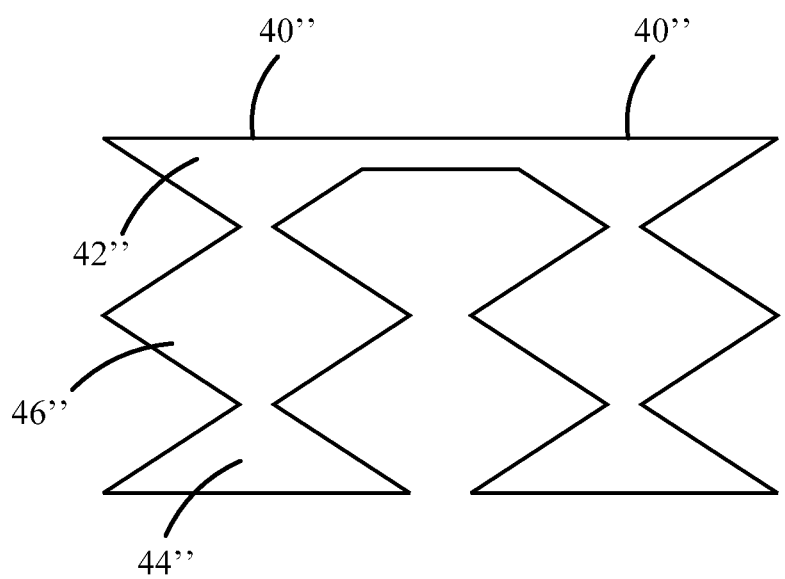
FIG. 6 illustrates an enlarged diagram of an electrode group in FIG. 5.

Please refer to FIG. 6. FIG. 6 illustrates an enlarged diagram of an electrode group in FIG. 5.

The electrode group includes two second electrodes 40". Each of the two second electrodes 40" includes a first triangular part 42", a second triangular part 44", and a connecting part 46". A shape of the first triangular part 42" and a shape of the second triangular part 44" are opposite to each other. A shape of the connecting part 46" is a diamond. The first triangular part 42" and the second triangular part 44" are electrically connected to each other through the connecting part 46". An advantage of the touch electrode structure in FIG. 6 is that touch accuracy and linearity can be increased.

Figure 7:
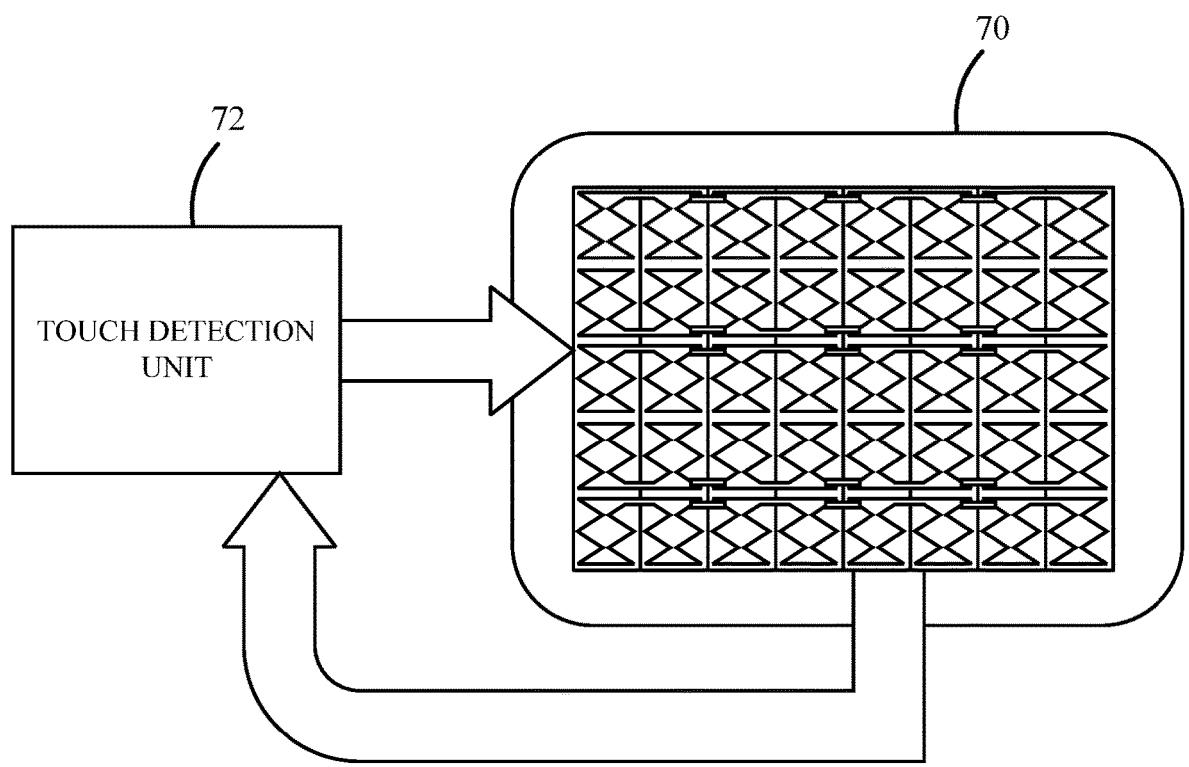
FIG. 7 illustrates a capacitive touch system in accordance with an embodiment of the present disclosure.

Please refer to FIG. 7. FIG. 7 illustrates a capacitive touch system in accordance with an embodiment of the present disclosure.

The capacitive touch system includes a touch panel 70 and a touch detection unit 72.

The touch panel 70 includes a touch electrode structure. The touch electrode structure can be referred to the related description of FIG. 5 and is not repeated herein. It is noted that the touch electrode structure can be the embodiment of FIG. 1 or FIG. 3.

The touch detection unit 72 is electrically connected to the touch electrode structure and configured to detect a touch signal or a hover signal on the touch electrode structure.

In the touch electrode structure and the capacitive touch system of the present disclosure, since at least one electrode group of each second electrode series includes two second electrodes which are electrically connected to each other, a connecting wire is not required between the two second electrodes of the at least one electrode group. The number of the connecting wires and the number of the vias can be saved. Furthermore, the present disclosure provides several types of patterns of the second electrodes, an advantage that a wiring layout is simple or that touch accuracy and linearity can be increased can be reached.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. A touch electrode structure, comprising:
    a substrate, wherein the substrate is a two-layer board;
    a plurality of first electrode series formed on a first surface of the substrate in a first direction, wherein each of the first electrode series comprises a plurality of first electrodes;
    a plurality of second electrode series formed on the first surface of the substrate in a second first direction, wherein each of the second electrode series comprises a plurality of second electrodes; and
    at least one connecting wire formed on a second surface of the substrate, wherein each of the second electrode series comprises a plurality of electrode groups, each of the electrode groups comprises two of the second electrodes, the two of the second electrodes are electrically connected to each other on the first surface of the substrate, and two adjacent ones of the electrode groups are electrically connected to each other through the at least one connecting wire,
    wherein each of the two second electrodes in each of the electrode groups comprises:
    a first triangular part;
    a second triangular part; and
    a connecting part,
    wherein a shape of the first triangular part and a shape of the second triangular part are opposite to each other, a shape of the connecting part is a diamond, and the first triangular part and the second triangular part are electrically connected to each other through the connecting part.

2. A capacitive touch system, comprising:
a touch panel comprising a touch electrode structure, the touch electrode structure comprising:
a substrate, wherein the substrate is a two-layer board;
a plurality of first electrode series formed on a first surface of the substrate in a first direction, wherein each of the first electrode series comprises a plurality of first electrodes;
a plurality of second electrode series formed on the first surface of the substrate in a second first direction, wherein each of the second electrode series comprises a plurality of second electrodes; and
at least one connecting wire formed on a second surface of the substrate, wherein each of the second electrode series comprises a plurality of electrode groups, each of the electrode groups comprises two of the second electrodes, the two of the second electrodes are electrically connected to each other on the first surface of the substrate, and two adjacent ones of the electrode groups are electrically connected to each other through the at least one connecting wire; and
a touch detection unit electrically connected to the touch electrode structure and configured to detect a touch signal or a hover signal on the touch electrode structure,
wherein each of the two second electrodes in each of the electrode groups comprises:
a first triangular part;
a second triangular part; and
a connecting part,
wherein a shape of the first triangular part and a shape of the second triangular part are opposite to each other, a shape of the connecting part is a diamond, and the first triangular part and the second triangular part are electrically connected to each other through the connecting part.

* * * * *